(12) United States Patent
Savari et al.

(10) Patent No.: US 9,725,635 B2
(45) Date of Patent: Aug. 8, 2017

(54) METHODS AND COMPOSITIONS TO USE SHAPE CHANGING POLYMERS IN SUBTERRANEAN FORMATIONS

(71) Applicant: Halliburton Energy Services, Inc., Houston, TX (US)

(72) Inventors: Sharath Savari, Stafford, TX (US); Matthew L. Miller, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/412,708

(22) PCT Filed: Jan. 17, 2014

(86) PCT No.: PCT/US2014/012094
§ 371 (c)(1),
(2) Date: Jan. 5, 2015

(87) PCT Pub. No.: WO2015/108532
PCT Pub. Date: Jul. 23, 2015

(65) Prior Publication Data
US 2016/0312098 A1 Oct. 27, 2016

(51) Int. Cl.
*C09K 8/035* (2006.01)
*C09K 8/50* (2006.01)
*C09K 8/44* (2006.01)
*C09K 8/60* (2006.01)

(52) U.S. Cl.
CPC ............... *C09K 8/035* (2013.01); *C09K 8/44* (2013.01); *C09K 8/50* (2013.01); *C09K 8/60* (2013.01); *C09K 2208/04* (2013.01); *C09K 2208/08* (2013.01)

(58) Field of Classification Search
CPC .... C09K 2208/08; C09K 8/032; C09K 8/035; C09K 8/48; C09K 8/516; C09K 8/487; C09K 2208/26; C09K 2208/32; C09K 8/40; C09K 8/426; C09K 8/44; C09K 8/493; C09K 8/52; C09K 8/5751; C09K 8/64; C09K 2208/10; C09K 8/03; C09K 8/24; C09K 8/92; C09K 8/206; C09K 8/22; C09K 8/42; C09K 8/467; C09K 8/70; C09K 8/74; E21B 21/003; E21B 33/14; E21B 21/00; E21B 33/138; E21B 43/12; E21B 7/00; E21B 43/26; E21B 33/13; E21B 47/0005; E21B 47/102

See application file for complete search history.

(56) References Cited
U.S. PATENT DOCUMENTS

| | | | |
|---|---|---|---|
| 7,829,507 B2 | 11/2010 | Todd et al. | |
| 8,353,346 B2 | 1/2013 | Johnson et al. | |
| 8,517,103 B1 | 8/2013 | Jamison et al. | |
| 8,530,393 B2 | 9/2013 | Kulkarni et al. | |
| 8,739,872 B1 | 6/2014 | Miller et al. | |
| 8,746,339 B2 | 6/2014 | Murphy et al. | |
| 8,765,645 B2 | 7/2014 | Livanec et al. | |
| 8,887,808 B2 | 11/2014 | Kumar et al. | |
| 2004/0034405 A1* | 2/2004 | Dickson | A61F 2/82 623/1.11 |
| 2006/0125188 A1* | 6/2006 | Verbrugge | B60J 10/00 277/319 |
| 2008/0017376 A1* | 1/2008 | Badalamenti | C04B 28/02 166/292 |
| 2009/0038855 A1* | 2/2009 | Ravi | C09K 8/03 175/65 |
| 2009/0221452 A1 | 9/2009 | Whitfill et al. | |
| 2011/0036582 A1 | 2/2011 | Ladva et al. | |
| 2012/0055672 A1* | 3/2012 | Tollefsen | E21B 17/006 166/302 |
| 2012/0264658 A1* | 10/2012 | Kulkarni | C09K 8/04 507/138 |
| 2012/0264659 A1 | 10/2012 | Kulkarni et al. | |
| 2013/0298662 A1 | 11/2013 | Jamison et al. | |
| 2013/0303411 A1 | 11/2013 | Wagle et al. | |
| 2013/0332089 A1 | 12/2013 | Kulkarni et al. | |
| 2014/0014332 A1 | 1/2014 | Savari et al. | |
| 2014/0090896 A1 | 4/2014 | Wagle et al. | |
| 2014/0158354 A1 | 6/2014 | Kumar et al. | |
| 2014/0202772 A1 | 7/2014 | Kulkarni et al. | |
| 2014/0231082 A1 | 8/2014 | Jamison et al. | |
| 2014/0238674 A1 | 8/2014 | Savari et al. | |
| 2014/0262281 A1 | 9/2014 | Kulkarni et al. | |
| 2014/0262283 A1 | 9/2014 | Savari et al. | |
| 2014/0353042 A1 | 12/2014 | Karale et al. | |

OTHER PUBLICATIONS http://www.gordonengland.co.uk/conversion/density.htm downloaded on Oct. 14, 2016.*
Behl, Marc et al., "Temperature-memory polymer actuators", Behl, "Temperature-memory polymer actuators," PNAS, Jul. 30, 2013, pp. 12555-12559, vol. 110 No. 31, National Academy of Sciences, USA, (Jul. 30, 2013), 5 pgs.
"International Search Report and Written Opinion" dated Oct. 16, 2014, PCT/US14/12094, 9 pgs.
Zotzmann, Jorg et al., "Reversible Triple-Shape Effect of Polymer Networks Containing Polypentadecalactone- and Poly(e-caprolactone)-Segments", Wiley-VCH Verlag GmbH & Co. KGaA, Weinheim, DOI: 10.1002/adma.200904202, (2010), pp. 3424-3429.

* cited by examiner

*Primary Examiner* — Kumar R Bhushan
(74) *Attorney, Agent, or Firm* — Polsinelli PC (57) ABSTRACT

A wellbore treatment fluid containing lost circulation materials and methods for using the treatment fluid, the fluid including a carrier fluid and shape changing polymer structures. The shape changing polymer structures may be folded or rolled into various cross-sectional surface area reducing configurations and are capable of reversibly extending and reversibly contracting with changes in temperature. The materials forming the shape changing polymer structures may include at least one selected from poly[ethylene-co-(vinyl acetate)], poly(ω-pentadecalactone), poly(ε-caprolactone), and copolymers thereof. A method for utilizing the treatment fluid for creation or maintenance of a well includes forming or providing the treatment fluid and introducing the treatment fluid into a borehole.

19 Claims, 4 Drawing Sheets

METHODS AND COMPOSITIONS TO USE SHAPE CHANGING POLYMERS IN SUBTERRANEAN FORMATIONS

BACKGROUND

Treatment fluids can be employed in a variety of subterranean operations. As used herein the terms "treatment," "treating," other grammatical equivalents thereof refer to any subterranean operation that uses a fluid in conjunction with performing a desired function and/or for achieving a desired purpose. The terms "treatment," "treating," and other grammatical equivalents thereof do not imply any particular action by the fluid or any component thereof. Illustrative subterranean operations that can be performed using treatment fluids may include, for example, drilling operations, cementing operations, fracturing operations, sand control operations, gravel packing operations, acidizing operations, conformance control operations, fluid diversion operations, fluid blocking operations, and the like.

While drilling oil and gas wells, a drilling fluid is circulated through a drill bit in a well bore and then back to the earth surface, thereby removing cuttings from the well bore. The drilling fluid is then often reconditioned and reused. In the well bore, the drilling fluid maintains a predetermined hydrostatic pressure. However, when the drill bit encounters certain unfavorable subterranean zones, the hydrostatic pressure is compromised, resulting in what is commonly known as "lost circulation." For example, lost circulation occurs when the drill bit encounters comparatively low pressure subterranean zones, such as vugs, fractures, and other thief zones. Similarly, encountering comparatively high pressure subterranean zones results in crossflows or underground blow-outs, and subsequently lost circulation.

Treatment for fluid-loss control can be used during any of drilling, completion, and intervention operations. During completion or intervention, stimulation is a type of treatment performed to enhance or restore the productivity of oil or gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production, and controlling sand or fines production. Still other types of completion or intervention treatments include, but are not limited to, damage removal, formation isolation, wellbore cleanout, scale removal, and scale control.

Different types of "lost circulation materials" (hereinafter "LCMs") may be used. These include ground marble, graphitic based materials, ground nut shells, ground almond shells, cedar fiber, mineral and other types of polymeric fibers, carbon fibers, cellulose, chitin, polymers, and nano materials. Polymers have been used in certain drilling applications, such as additives to drilling fluids. The properties or shapes of materials constructed of the polymers may be changed by altering the treatment fluid properties or the physical conditions such as temperatures. Cellulose and chitin sheets have been coated or partially coated with polymers that deform when subjected to various conditions. However, typically the cellulose and chitin sheets may dissolve in the various types of drilling fluids. Additionally, the substrates and coating polymers are used in a way that only allows them to change their shape only once, and the shape changing is often triggered by a change in fluid properties, thereby requiring different polymer materials for different treatment fluids. Further, the polymers are not able to revert back to their original state if required, particularly if the substrate structure has dissolved in the fluid. At times, conventional lost circulation materials do not work as efficiently as needed. And hence there is always a need to supplement the LCMs with novel or new materials to enhance their performance. Accordingly, there is a need for a shape changing polymer structure that may be used in a variety of different types of drilling fluids, and after being deployed and activated in a well, has the ability to revert back to its original shape.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

The present invention generally relates to the use of shape changing polymers in subterranean operations, and, more specifically, to the use of shape changing polymer structures in wellbore fluids alone or in conjunction with conventional LCMs, in production enhancing treatments, and in completion, workover and kill subterranean operations.

A novel use of shape changing polymer LCMs is to utilize materials that may be folded or rolled into useful shapes for use in downhole applications. The shape changing polymer structures may additionally provide suspension, and or prevent sag.

The polymer materials used in the present invention change shape based on the temperature, and are termed polymer actuators. Most conventional materials can only change form once. For example, Diamond Seal™ (a lost circulation material made from a synthetic polymer available from Halliburton Energy Services, Inc., Houston, Tex.) will swell in water (change shape), but is not be able to go back to its original shape upon the removal of water. Other materials such as polyethylene or polyurethane are placed under stress while they cool and then change shape when they are heated; shrink wrap is an example of this.

The novel materials used in the present invention have the ability to change their form more than once. The active polymers are built of structural elements that undergo changes to their mobility within a very wide temperature range. In several embodiments, the shape changing polymer structures are activated by temperature and are capable of reversibly extending and reversibly contracting with changes in temperature.

Shape Changing Polymer Structures

Figure 1:
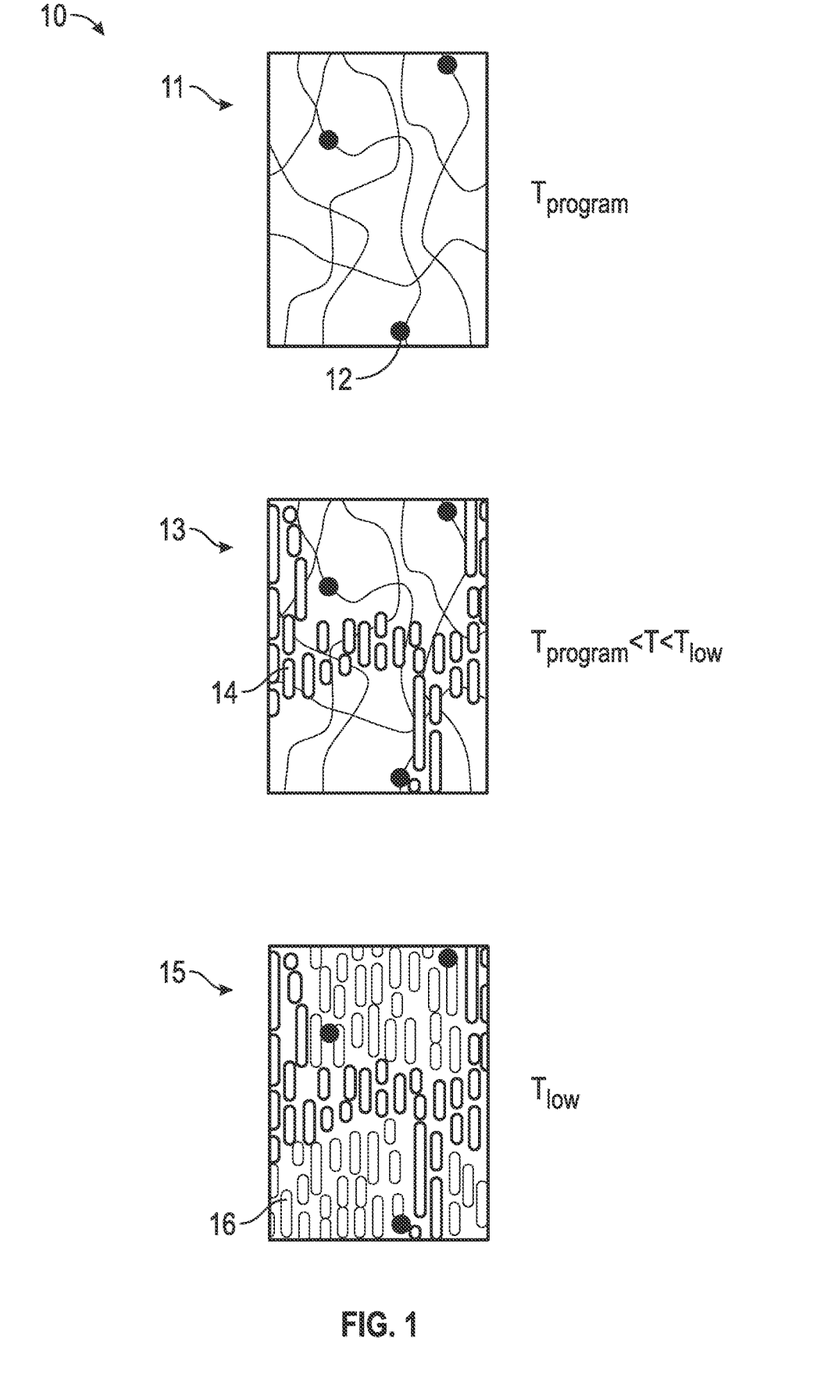
FIG. 1 shows an illustrative example of the polymeric units of shape changing polymer structures in the prior art.

In many embodiments, for purposes of this disclosure, shape changing polymer structures are polymeric structures including shape-memory polymers that are activated by temperature, thereby causing elongation or contraction of the shape changing polymer structure. In some embodiments, the elongation or contraction of shape changing polymer structure is reversible. One of the polymers useful in the present invention is poly [ethylene-co-(vinyl acetate)], polyester based. A second example contains two crystallizable polyester segments, poly($\omega$-pentadecalactone) and poly ($\epsilon$-caprolactone), associated with two discrete melting temperatures representing two transition temperatures. Shape-memory polymers (SMPs) are known in the art and may manufactured by the methods disclosed in Jörg Zotzmann, et al., *Reversible Triple-Shape Effect of Polymer Networks Containing Polypentadecalactone and Poly($\epsilon$-caprolactone)-Segments*, Advanced Materials, 2010, vol. 22, pp. 3424-3429; Marc Behl, et al., *Temperature-memory Polymer Actuators*, PNAS Early Edition, vol. 110 no. 31, 12555-12559, doi: 10.1073/pnas.1301895110; and Behl et al., Supporting Information, 10.1073/pnas.1301895110, the entire contents of all preceding references are incorporated herein. In an embodiment, the programming step is the first process. FIG. 1, of this disclosure is an annotated version of FIG. 1A in Marc Behl, et al., and illustrates an amorphous polymer 10 with a wide melting point range being heated above its lower onset melting point to a higher temperature called a programming temperature and formed into a secondary shape in a process referred to as programming 11. The crosslinked polymers 12 assist in maintaining the shape. Next, while the secondary shape is maintained using an external stress, the polymer is cooled to a lower temperature 15 below its onset melting point, thereby forming crystalline domains including internal skeleton forming domains 14 and activation domains 16. After the external stress is removed, the polymer keeps its secondary shape at lower temperatures. Elongation toward the original shape may be obtained by increasing the temperature to a value 13 that is above the onset melting point and up to the offset melting point. The internal skeleton forming domains 14 remain and allow the elongation of the polymer to occur at various amounts depending upon the temperature. To reverse the process, the polymer may be contracted by lowering the temperature from the intermediate zone 13 toward the low temperature zone 15.

In a preferred embodiment, a polymer useful in the present invention may be prepared by mixing 98 g poly [ethylene-co-(vinylacetate)] with a vinyl acetate content of 9 wt % (Greenflex ML30™, available from Polimeri Europa) and 2 g of dicumyl peroxide (available from Sigma-Aldrich) in a twin-screw extruder (EuroPrismLab™, available from Thermo Fisher Scientific) at 110° C. and 50 rpm. Another vinyl acetate that may be used is 18 wt % (Elvax460™, available from DuPont). The blends may then be compression molded into films with 1 mm thickness and subsequently cross-linked at 200° C. and 20 bar for 25 minutes. In some embodiments, the resulting polymer films with higher vinyl acetate content have a broader temperature range in which the polymer film can be elongated or contracted. In certain embodiments, elongation is a function of temperature. When a polymer above has approximately 20% vinyl acetate repeating units, a programming temperature of 90° C. followed by a low temperature of about 25° C. to set the contracted shape may result in the contracted shape at about 25° C. that is about 50% of its elongated configuration at about 75° C. Heating the contracted polymer from 25° C. to a number between 25° C. and 90° C. may result in increasing expansion as the temperature increases. In some embodiments, elongation begins at about 50° C. and continues until about 75° C. Contraction of the polymer occurs as the temperature is lowered from about 75° C. to about 50° C.

In an embodiment, a shape changing polymer structure in the form of a ribbon is created by folding a polymer film comprising approximately 20% vinyl acetate repeating units into an accordion shape at a programming temperature of about 90° C. The structure is then cooled to about 25° C. while in the folded configuration. Heating the resulting ribbon from 25° C. to a number between 25° C. and 90° C. results in increasing elongation of the ribbon as the temperature increases.

Shape Changing Polymer Structure Configurations

Folded 3-D Structures

Figure 2:
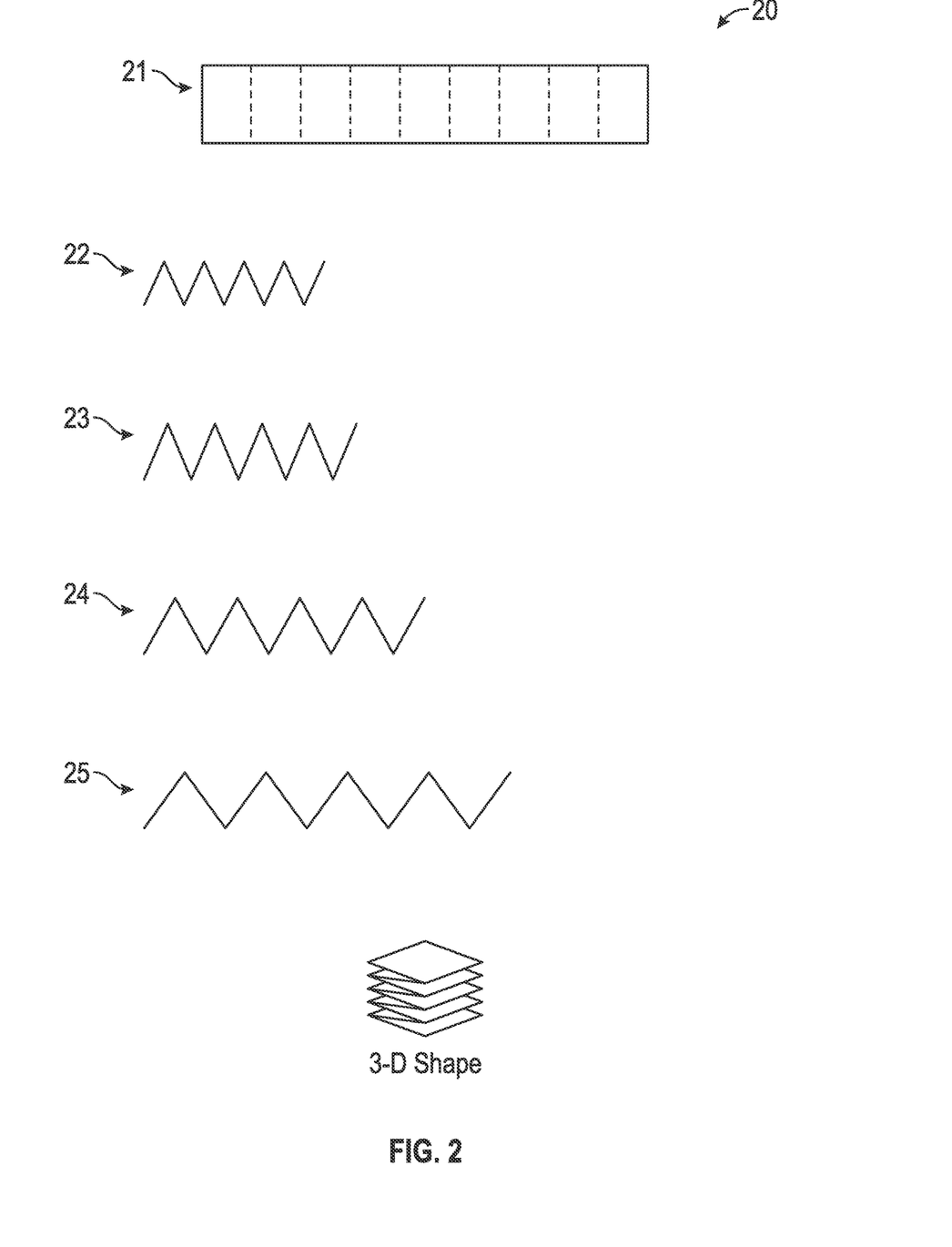
FIG. 2 shows an illustrative example of a folded, 3-D shape changing polymer structures of the invention in various states of deployment.

In FIG. 2, one embodiment of the folded 3-D structure of the shape changing polymers is illustrated. In an illustrative embodiment 20, the shape changing polymer structure 21 is folded into an accordion pleating configuration 22. The folds do not need to be uniform, but uniform folds may result in a more compact structure when the sheet is compressed. This process is performed at the programming temperature. The temperature is then lowered to a low temperature below the melting point(s) of the polymer. The compressed accordion pleated sheet 22 is sent downhole to a treatment zone. This compact configuration allows the pleated shape changing polymer structures to be pumped downhole at a fraction of the original cross-sectional area, thereby delivering a concentrated LCM to a targeted portion of the wellbore without altering the rheological properties of the carrier fluid as a powder may alter it. In an embodiment, the compressed shape changing polymer 22 elongates 23, 24, 25 due to the elevated downhole temperature. In another embodiment, the extended shape changing polymer contracts due to decreased downhole temperatures. The compressed shape changing polymer structures 22 may elongate partially 23, 24, but usually not back to its original cross-sectional area 21. In an embodiment, the uncompressed shape changing polymer structure's cross-section has at least doubled from its compressed size. The fold or pleat to create the accordion structure may be in half, or may be any fold that reduces the cross-sectional area of the shape changing polymer structure. In another embodiment, the elongation process is reversed by lowering the temperature. A structure at the maximum elongation temperature 25 will decrease in length (contract) 24, 23 as the temperature is lowered.

Rolled 3-D Structures

Figure 3:
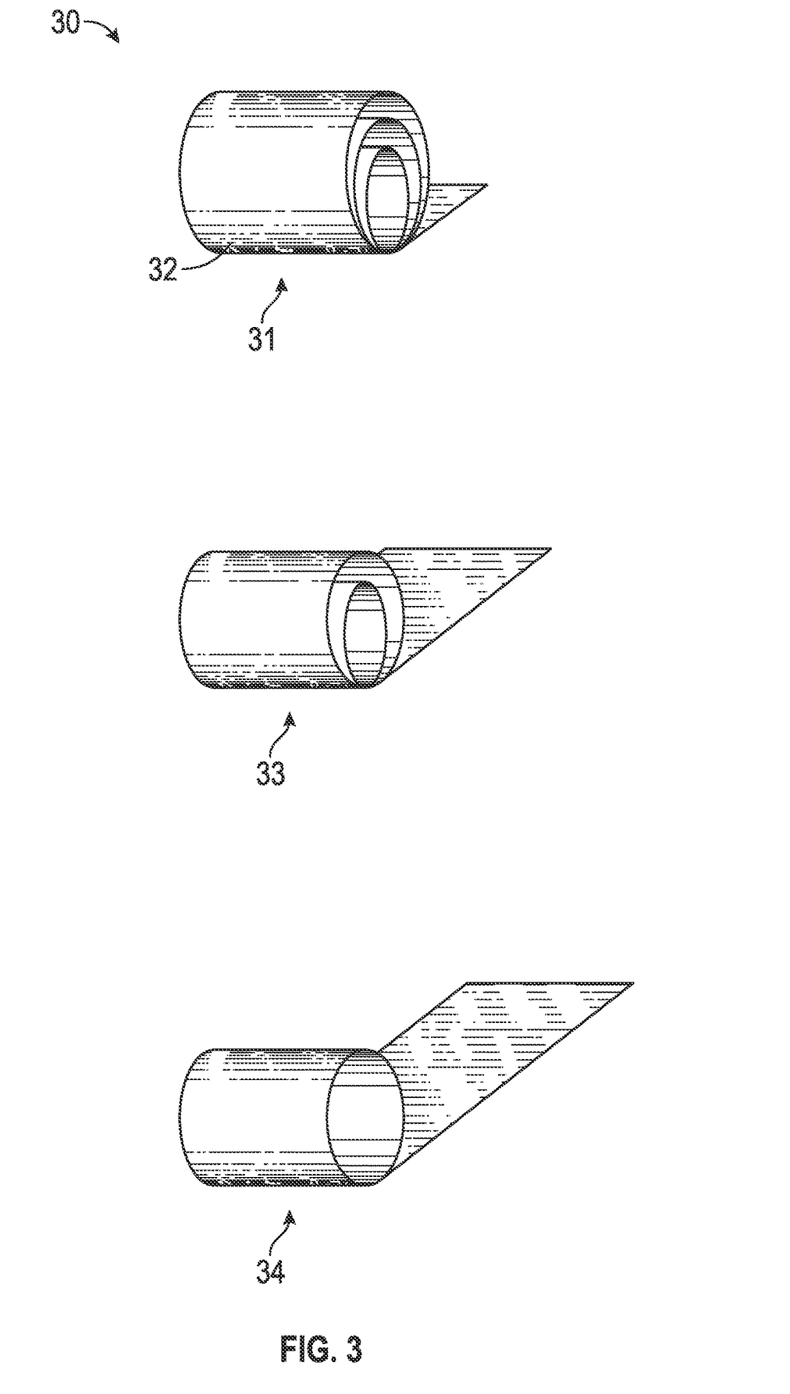
FIG. 3 shows an illustrative example of a rolled, 3-D shape changing polymer structures of the invention in various states of deployment.

As illustrated in FIG. 3, some embodiments of the shape changing polymer structures are directed to a rolled 3-D structure 30. In one embodiment, a sheet-like or ribbon-like shape changing polymer structure 32 is rolled into a scroll 31. Upon exposure to an appropriate temperature wellbore fluid, the scroll unrolls (elongates) 33, 34, the amount being determined by the temperature of the fluid. In various embodiments, the variables that may be changed are the helical dimensions, such as aspect ratio and the tightness of the roll, and the moduli of the polymer phase. Changes to any of the preceding variables may be made to design different shapes that may be pumped downhole and then deploy downhole into a different shape. In an embodiment, the rolled structure 31 elongates 33, 34 due to an elevated downhole temperature. In a further embodiment, reducing the temperature of the wellbore fluid causes the elongated, unrolled structure 33, 34 to roll (contract) back toward its original shape 31. Intermediate temperatures, i.e., those between the fully rolled temperature and the temperature causing full unrolling, may cause partial unrolling 33 or re-rolling of the shape changing polymer structures.

Shape Changing Polymer Structure as Coating

In certain embodiments, the shape changing polymer structures may be coated on substrates. The substrates allow the coating polymer to extend and retract in a reversible manner, and the substrates do not dissolve or disintegrate in the treatment fluids used to deliver the structures downhole. In exemplary embodiments, the shape changing polymer structures are not a coating on a nano-carbohydrate based sheet.

Fluids Including Shape Changing Polymer Structures

The present invention is also directed to a wellbore fluid including: a carrier fluid and shape changing polymer structures, wherein the shape changing polymer structures are activated by temperature and are capable of reversibly extending and reversibly contracting with changes in temperature.

In some embodiments, fluids of the present invention include a carrier fluid and shape changing polymer structures. The resulting fluid may be referred to as a treatment fluid, and may include additional additives. In certain embodiments, the carrier fluid is aqueous based. In other embodiments, the carrier fluid is oil-based. In an illustrative example, one or more of the disclosed shape changing polymer structures may be added to a carrier fluid via a mixing hopper. This hopper may be coupled to a retention pit, thereby holding the treatment fluid until it is pumped downhole. Additional additives may be added with the shape changing polymer structures to the mixing hopper along with the shape changing polymer structures, or at a different time than the shape changing polymer structures. In other embodiments, the shape changing polymer structures may be added to the carrier fluid at any other location in the drilling assembly.

In various embodiments, the treatment fluids may be provided or formed at the well site, or at a remote site. In another embodiment, the combining of the carrier fluid and the shape changing polymer structures may occur at a site away from the well. This combination may be added to additional materials at the well site to form the treatment fluid.

In some embodiments, the treatment fluid components may be combined by introducing a continuously flowing stream of one material into the flowing stream of another material so that the streams are combined and mixed while continuing to flow as a single stream as part of the well treatment.

The shape changing polymer structures present in the wellbore treatment fluid may be present in any effective amounts. Typically, the type of treatment fluid, the well conditions, and the type of treatment determine the amount of shape changing polymer structures that are necessary. In one embodiment, the shape changing polymer structures are present in the treatment fluid in an amount of from about 0.1 ppb to about 100 ppb of the treatment fluid.

Carrier Fluids

In several embodiments, an aqueous carrier fluid may be used. The aqueous carrier fluid of the present embodiments can generally be from any source, provided that the fluids do not contain components that might adversely affect the stability and/or performance of the treatment fluids of the present invention. In various embodiments, the aqueous carrier fluid can comprise fresh water, acidified water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

In some embodiments, the aqueous carrier fluid is present in the treatment fluid the amount of from about 85% to about 98% by volume of the treatment fluid. In another embodiment, the aqueous carrier fluid is present in the amount of from about 90% to about 98% by volume of the treatment fluid. In further embodiments, the aqueous carrier fluid is present in the amount of from about 94% to about 98% by volume of the treatment fluid.

In several embodiments, the carrier fluid is a non-aqueous based carrier fluid. In one embodiment, the carrier fluid is an oil-based drilling fluid. The oil based drilling fluid is may be present in the treatment fluid in the amount of from about 85% to about 98% by volume of the treatment fluid.

Subterranean Formation Treatment Procedures

In an embodiment, a well treatment fluid is delivered into a well within a relatively short period of time after forming the well treatment fluid. In one embodiment, the time period is within 30 minutes to one hour. In a preferred embodiment, delivering of the well treatment fluid is immediately after forming the well treatment fluid, which is "on the fly." It should be understood that delivering the well treatment fluid into the wellbore can advantageously include the use of one or more fluid pumps.

Drilling and LCMs

Lost circulation requires remedial steps. Most remedial steps comprise introducing LCMs into the well bore to seal the above-described low pressure subterranean zones or high pressure subterranean zones. The shape changing polymer structures of the present invention may be used as LCMs in the lost circulation examples above. In one embodiment, the shape changing polymer structures are present in the treatment fluid at a concentration from about 0.1 ppb to about 200 ppb in the treatment fluid, or more preferably, from about 1 ppb to about 100 ppb in the treatment fluid.

In another embodiment, the shape changing polymer structures of the present invention are combined with additional LCMs. These additional LCMs may include at least one of, but are not limited to sand; bauxite; ceramic materials; glass materials; ground marble; graphitic based materials; nut shell pieces; cured resinous particulates comprising nut shell pieces; seed shell pieces; cured resinous particulates comprising seed shell pieces; fruit pit pieces; cured resinous particulates comprising fruit pit pieces, wood; chemical sealant types; and any combination thereof. In a preferred embodiment, the additional LCMs include at least one of ground marble, graphitic based materials, nut shells, fibers and combinations thereof. Chemical sealant types of LCMs include, but are not limited to, N-SQUEEZE/N-PLEX™, (cross-linkable polymeric pills available from Halliburton Energy Services, Inc., and typically used at about 50 to about 60 ppb of drilling fluid); FUSE-IT™ (a synthetic polymer suspended in base oil that typically forms a gunk when contacted with water, available from Halliburton Energy Services, Inc., and typically mixed as per the hole treatment volume); and gunk/reverse gunk additives that are typically mixed as per the hole treatment volume. In one embodiment, the shape changing polymer structures and LCMs are present in the treatment fluid at a concentration from about 01. ppb to about 200 ppb in the treatment fluid, or more preferably, from about 1 ppb to about 100 ppb in the treatment fluid.

Well Stimulation

In some embodiments such as fracturing operations, the well treatment fluid may be introduced into the subterranean formation at or above a pressure sufficient to create or enhance one or more fractures in a portion of the subterranean formation. In an embodiment, the introducing of the well treatment fluid comprises introducing it under conditions for fracturing a treatment zone. The fluid is introduced into the treatment zone at a rate and pressure that are at least sufficient to fracture the zone.

The shape changing polymer structures of the present invention may be present in the fracturing fluid when combined with a carrier fluid. In one embodiment, the shape changing polymer structures are present in the fracturing fluid at a concentration from about 10 wt % to about 25 wt %—of the fracturing fluid, or more preferably, from about 15 wt % to about 20 wt %—of the fracturing fluid.

Completion, Workover, and Kill

When conducting subterranean operations, it can sometimes become necessary to block the flow of fluids in the subterranean formation for a prolonged period of time, typically for at least about one day or more. In some cases, the period of time can be much longer, days or weeks. For example, it can sometimes be desirable to impede the flow of formation fluids for extended periods of time by introducing a kill pill or perforation pill into the subterranean formation to at least temporarily cease the communication between wellbore and reservoir production. Kill pill refers to a small amount of a treatment fluid introduced into a wellbore that blocks the ability of formation fluids to flow into the wellbore.

Generally, subterranean well completion, workover and kill operations are conducted while the well is filled with fluid. A completion, workover, or kill fluid, such as a kill pill, is commonly placed in a wellbore prior to the operation and is often maintained in the wellbore for the duration of the operation. The kill pill applies a hydrostatic pressure against the formation fluid, which is greater than the pressure exerted by the formation fluid attempting to intrude into the wellbore. This overbalanced hydrostatic pressure prevents the intrusion of formation fluids into the wellbore during performance of the given wellbore operation, which is necessary from an operational standpoint to prevent interference from formation fluids and from a safety standpoint to prevent blowouts and well kicks. In uncased wells, maintaining an overbalanced hydrostatic pressure also helps prevent the wellbore wall from caving in or sloughing into the wellbore. Other functions of kill pills agents are to minimize fluid loss from the wellbore into the surrounding formation, to help support casing and tubing strings, and to provide a medium through which completion and workover operations can be performed. Well completion operations typically include gravel packing as well as cementing operations.

The shape changing polymer structures of the present invention may be present in the kill pill when combined with a carrier fluid. In one embodiment, the shape changing polymer structures are present in the kill pill at a concentration from about 10 wt % to about 25 wt % of the kill pill, or more preferably, from about 15 wt % to about 20 wt % of the kill pill.

The present invention is also directed to a wellbore treatment system including a drilling apparatus configured to: form or provide a well fluid including shape changing polymer structures, wherein the shape changing polymer structures are activated by temperature and are capable of reversibly extending and reversibly contracting with changes in temperature; and introduce the well fluid into a well.

Treatment Fluid Additives

A well treatment fluid may contain additives that are commonly used in oil field applications, as known to those skilled in the art. These include, but are not necessarily limited to, brines, inorganic water-soluble salts, salt substitutes (such as trimethyl ammonium chloride), pH control additives, surfactants, crosslinkers, breakers, breaker aids, oxygen scavengers, alcohols, scale inhibitors, corrosion inhibitors, hydrate inhibitors, fluid-loss control additives, oxidizers, chelating agents, water control agents (such as relative permeability modifiers), consolidating agents, proppant flowback control agents, conductivity enhancing agents, clay stabilizers, sulfide scavengers, fibers, bactericides, and combinations thereof.

One of skill in the art will ascertain that shape changing polymer structure based fluids offer distinct advantages such as being constructed of one material that can work for many fluid types. Additionally, the shape changing is reversible by simply adjusting the temperature. Further, polymers may be selected such that they can be used in both reservoir and non-reservoir zones.

The exemplary shape changing polymer structures disclosed herein may directly or indirectly affect one or more components or pieces of equipment associated with the preparation, delivery, recapture, recycling, reuse, and/or disposal of the disclosed shape changing polymer structures. For example, and with reference to FIG. 4, the disclosed shape changing polymer structures may directly or indirectly affect one or more components or pieces of equipment associated with an exemplary wellbore drilling assembly 100, according to one or more embodiments. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure.

Figure 4:
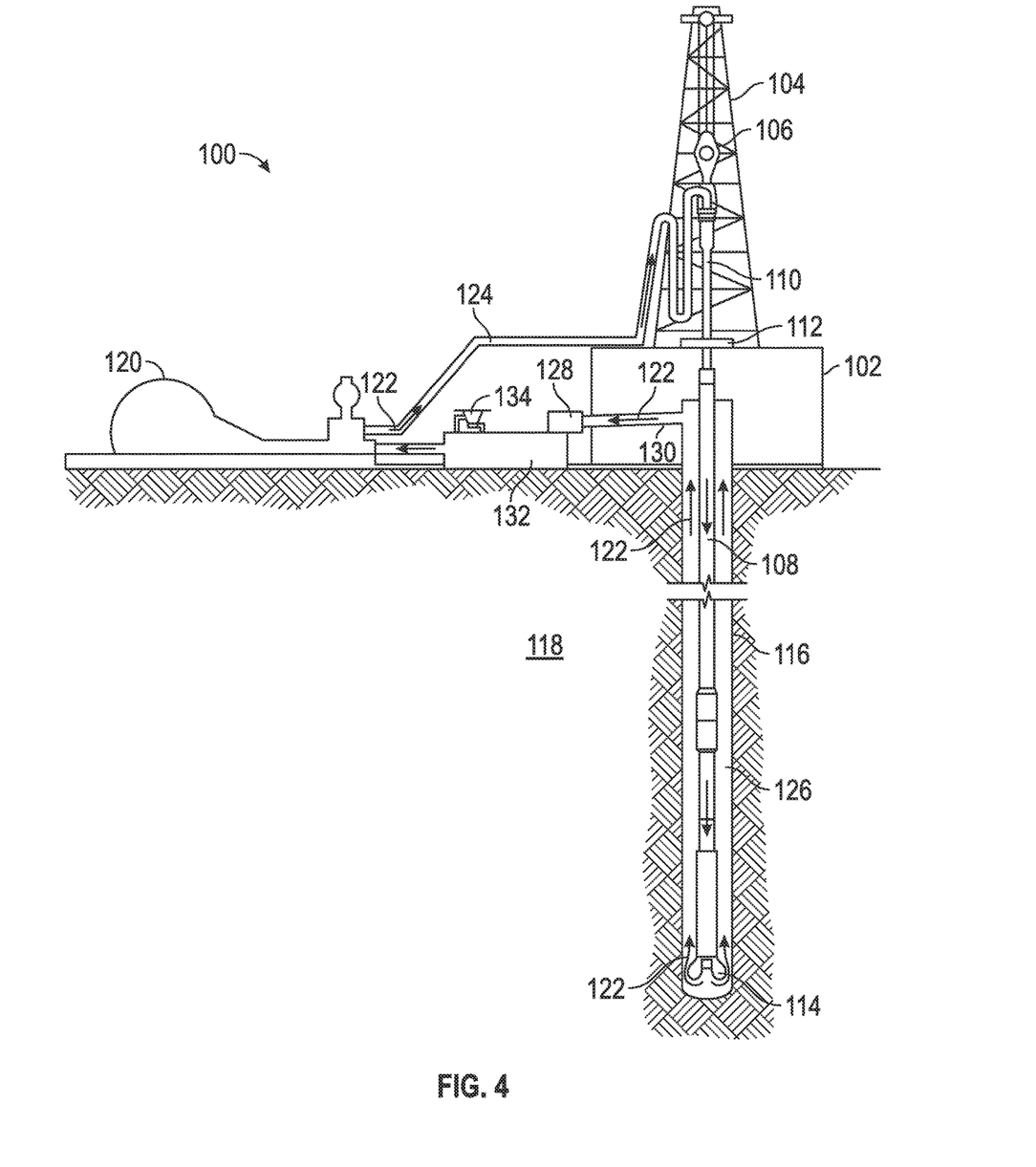
FIG. 4 shows an exemplary wellbore drilling assembly utilizing the shape changing polymer structures of the present invention.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed shape changing polymer structures may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed shape changing polymer structures may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed shape changing polymer structures may be stored, reconditioned, and/or regulated until added to the drilling fluid 122.

As mentioned above, the disclosed shape changing polymer structures may directly or indirectly affect the components and equipment of the drilling assembly 100. For example, the disclosed shape changing polymer structures may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the exemplary shape changing polymer structures.

The disclosed shape changing polymer structures may directly or indirectly affect the pump 120, which representatively includes any conduits, pipelines, trucks, tubulars, and/or pipes used to fluidically convey the shape changing polymer structures downhole, any pumps, compressors, or motors (e.g., topside or downhole) used to drive the shape changing polymer structures into motion, any valves or related joints used to regulate the pressure or flow rate of the shape changing polymer structures, and any sensors (i.e., pressure, temperature, flow rate, etc.), gauges, and/or combinations thereof, and the like. The disclosed shape changing polymer structures may also directly or indirectly affect the mixing hopper 134 and the retention pit 132 and their assorted variations.

The disclosed shape changing polymer structures may also directly or indirectly affect the various downhole equipment and tools that may come into contact with the shape changing polymer structures such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed shape changing polymer structures may also directly or indirectly affect any downhole heat exchangers, valves and corresponding actuation devices, tool seals, packers and other wellbore isolation devices or components, and the like associated with the wellbore 116. The disclosed shape changing polymer structures may also directly or indirectly affect the drill bit 114, which may include, but is not limited to, roller cone bits, PDC bits, natural diamond bits, any hole openers, reamers, coring bits, etc.

While not specifically illustrated herein, the disclosed shape changing polymer structures may also directly or indirectly affect any transport or delivery equipment used to convey the shape changing polymer structures to the drilling assembly 100 such as, for example, any transport vessels, conduits, pipelines, trucks, tubulars, and/or pipes used to fluidically move the shape changing polymer structures from one location to another, any pumps, compressors, or motors used to drive the shape changing polymer structures into motion, any valves or related joints used to regulate the pressure or flow rate of the shape changing polymer structures, and any sensors (i.e., pressure and temperature), gauges, and/or combinations thereof, and the like.

EXAMPLES

The following muds may be formed using traditional blending methods known to those of skill in the art.

Example 1: Conventional Water-Based Drilling Mud

An exemplary water-based drilling mud utilizing the shape changing polymer structures of the present invention may contain the following:

Bentonite (AQUAGEL®), viscosifier: 5-8 lb/bbl; Modified starch (DEXTRID®), filtration control: 4-6 lb/bbl; Polyanionic cellulose (PAC™-L or PAC™-R), filtration control: 1-4 lb/bbl; NaOH or KOH, alkalinity source: 0.4-1.0 lb/bbl or as needed to target pH; Calcium Carbonate (BARACARB®), bridging agent: as needed to target density and fluid loss; Barium Sulfate (BAROID®), weighting agent: as needed to target density; Fresh water, continuous phase: as needed to target volume 1 bbl; ground marble: 0.1 ppb-100 ppb; and shape changing polymer structures (0.1 ppb to 100 ppb in the mud). AQUAGEL®, DEXTRID®, PAC™-L or PAC™-R, BARACARB®, and BAROID®, are available from Halliburton Energy Services, Inc., Houston, Tex.

Example 2: Biopolymer Sea Water/Brine-Based Mud

An exemplary brine-based mud utilizing the shape changing polymer structures of the present invention may contain the following:

Xanthan gum (BARAZAN® D PLUS), viscosifier: 1-3 lb/bbl; Modified starch (N-DRIL™ HT PLUS), filtration control: 2-4 lb/bbl; Polyanionic cellulose (PAC™-L), filtration control: 1-3 lb/bbl; Non-ionic polymeric clay inhibitor, smectite specific (CLAY GRABBER®): 2-5 lb/bbl or as needed; Non-ionic olymeric clay inhibitor, illite specific (CLAY SYNC™): 2-5 lb/bbl or as needed; NaOH or KOH, alkalinity source: 0.4-1.0 lb/bbl or as needed to target pH; Calcium Carbonate (BARACARB®), bridging agent: as needed to target density and fluid loss; Barium Sulfate (BAROID®), weighting agent: as needed to target density; Sea water and/or monovalent brine to 10% wt salts, continuous phase: as needed to target volume 1 bbl; ground marble: 0.1 ppb-100 ppb; and shape changing polymer structures (0.1 ppb to 100 ppb in the mud). BARAZAN® D PLUS, N-DRIL™ HT PLUS, CLAY GRABBER®, and CLAY SYNC™ are available from Halliburton Energy Services, Inc., Houston, Tex.

Example 3: High Performance Invert-Emulsion Oil Mud

An exemplary invert-emulsion oil based mud utilizing the shape changing polymer structures of the present invention may contain the following:

Modified fatty acid (RHEMOD™ L), viscosifier: 0.5-2 lb/bbl; Amorphous/fibrous material (TAU-MOD®), suspension aid/viscosifier: 0.5-5 lb/bbl; Polyaminated fatty acid (LE SUPERMUL™), primary emulsifier: 1-4 lb/bbl; Concentrated tall oil derivative (FACTANT™), secondary emulsifier: 0-4 lb/bbl; Lecithin dispersion, (DRILTREAT®), oil-wetting agent: 0.25-4 lb/bbl or as needed with added solids; Lime, alkalinity source/activator for emulsifiers: 0.1-2 lb/bbl; Calcium Carbonate (BARACARB®), bridging agent: as needed to target density and fluid loss; Barium Sulfate (BAROID®), weighting agent: as needed to target density; C16-C18 isomer olefin, continuous phase: as needed to target O/W ratio and volume 1 bbl; Divalent brine up to 25% wt salts, emulsified phase: as needed to target O/W ratio and volume 1 bbl; ground marble: 0.1 ppb-100 ppb; and shape changing polymer structures with additional oil-wetting agent (0.1 ppb to 100 ppb in the mud). RHEMOD™ L, TAU-MOD®, LE SUPERMUL™, FACTANT™, and DRILTREAT® are available from Halliburton Energy Services, Inc., Houston, Tex.

In an embodiment, the invention is directed to a wellbore fluid including a carrier fluid and shape changing polymer structures, wherein the shape changing polymer structures are activated by temperature and are capable of reversibly extending and reversibly contracting with changes in temperature. In certain embodiments, the shape changing polymer structures are not a coating on a nano-carbohydrate based sheet. In further embodiments, the shape changing polymer structures are folded or rolled to reduce their cross-sectional areas by at least 50%. In a preferred embodiment, the folded or rolled shape changing polymer structures are folded with an accordion pleating configuration. In an embodiment, the shape changing polymer structures comprise shape-memory polymers that are activated by temperature. The shape changing polymer structures may comprise at least one selected from poly[ethylene-co-(vinyl acetate)], poly(ω-pentadecalactone), poly(ε-caprolactone), copolymers thereof, and combinations thereof. In one embodiment, the shape changing polymer structures elongate when exposed to a temperature greater than about 25° C. In another embodiment, the shape changing polymer structures elongate when exposed to a temperature greater than about 50° C. In yet another embodiment, the shape changing polymer structures elongate when exposed to a temperature greater than about 25° C. In an additional embodiment, the shape changing polymer structures reach maximum elongation at the bottom-hole temperature in the well. In an exemplary embodiment, the shape changing polymer structures are present in the amount of about 0.1 ppb to about 200 ppb of the wellbore fluid. In an additional embodiment, the preceding wellbore fluid may be used in a wellbore treatment system comprising a drilling apparatus configured to form or provide a well fluid including shape changing polymer structures, wherein the shape changing polymer structures are activated by temperature and are capable of reversibly extending and reversibly contracting with changes in temperature; and introduce the well fluid into a well.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

The invention claimed is:

1. A method of treating a formation comprising:
    forming or providing a well fluid including shape changing polymer structures, wherein the shape changing polymer structures are activated by temperature and are capable of reversibly extending and reversibly contracting with changes in temperature;
    dispersing the shape changing polymer structures in a tank or flow stream having a carrier fluid, wherein before said dispersing the shape changing polymer structures are folded or rolled to reduce their cross-sectional areas by at least 50%, wherein the folded or rolled shape changing polymer structures are folded with an accordion pleating configuration; and
    introducing the well fluid into a well.

2. The method of claim 1, further comprising exposing the shape changing polymer structures to elevated temperatures, thereby extending the structures of the shape changing polymer structures.

3. The method of claim 1, wherein said shape changing polymer structures are not a coating on a nano-carbohydrate based sheet.

4. The method of claim 2, wherein the elevated temperatures are provided by the subterranean well conditions.

5. The method of claim 2, wherein the temperatures are elevated before the well fluid is added to the well.

6. The method of claim 2, wherein the temperatures are elevated after the well fluid has been added to the well.

7. The method of claim 1, further comprising exposing the shape changing polymer structures to reduced temperatures, thereby contracting the structures of the shape changing polymer structures.

8. The method of claim 7, wherein the temperatures are reduced by adding cooler well fluid to the well.

9. The method of claim 2, further comprising contracting the previously expanded shape changing polymer structures by adding cooler well fluid to the well.

10. The method of claim 1, wherein said shape changing polymer structures comprise shape-memory polymers that are activated by temperature.

11. The method of claim 1, wherein said shape changing polymer structures comprise at least one selected from poly[ethylene-co-(vinyl acetate)], poly(ω-pentadecalactone), poly(ε-caprolactone), copolymers thereof, and combinations thereof.

12. The method of claim 1, wherein said shape changing polymer structures elongate when exposed to a temperature greater than about 25° C.

13. The method of claim 1, wherein said shape changing polymer structures reach maximum elongation when exposed to a temperature greater than about 50° C.

14. The method of claim 1, wherein said shape changing polymer structures reach maximum elongation when exposed to a temperature greater than about 75° C.

15. The method of claim 1, wherein the shape changing polymer structures reach maximum elongation at the bottom-hole temperature in the well.

16. The method of claim 1, wherein the treatment method is at least one selected from lost circulation, conformance treatments utilizing production engineering fluids, lost circulation in cementing applications, well completions, well stimulations, well workovers, well kills, and combinations thereof.

17. The method of claim 1, wherein the shape changing polymer structures act as a suspending agent.

18. The method of claim 1, wherein the shape changing polymer structures are present in the amount of about 0.1 ppb to about 200 ppb of the well fluid.

19. The method of claim 1, wherein the well fluid additionally includes at least one of sand; bauxite; ceramic materials; glass materials; ground marble; graphitic based materials; ground nut shells; ground almond shells; mineral and polymeric fibers; carbon fibers; cured resinous particulates comprising nut shell pieces; seed shell pieces; cured resinous particulates comprising seed shell pieces; fruit pit pieces; cured resinous particulates comprising fruit pit pieces, wood; chemical sealant type LCMs; and any combination thereof.

* * * * *